(12) United States Patent
Monti

(10) Patent No.: US 7,990,632 B2
(45) Date of Patent: Aug. 2, 2011

(54) OPTICAL ELEMENT AND STRESS ATHERMALIZED HARD CONTACT MOUNT

(75) Inventor: Christopher L. Monti, Tucson, AZ (US)

(73) Assignee: Raytheon Company, Waltham, MA (US)

(*) Notice: Subject to any disclaimer, the term of this patent is extended or adjusted under 35 U.S.C. 154(b) by 65 days.

(21) Appl. No.: 12/390,334

(22) Filed: Feb. 20, 2009

(65) Prior Publication Data
US 2010/0214677 A1 Aug. 26, 2010

(51) Int. Cl.
*G02B 7/02* (2006.01)
(52) U.S. Cl. ............ 359/819; 359/811; 359/818
(58) Field of Classification Search .......... 359/819
See application file for complete search history.

(56) References Cited

U.S. PATENT DOCUMENTS

| | | | |
|---|---|---|---|
| 5,157,554 A | 10/1992 | Kashihara | |
| 5,798,876 A | 8/1998 | Nagano | |
| 6,108,145 A | 8/2000 | McCrary | |
| 6,292,312 B1 | 9/2001 | Broome | |
| 6,545,826 B2 * | 4/2003 | Horwitz et al. | 359/820 |
| 7,042,659 B2 * | 5/2006 | Huang et al. | 359/796 |
| 2008/0144196 A1 | 6/2008 | Kitamura et al. | |
| 2008/0186597 A1 | 8/2008 | Eguchi | |

OTHER PUBLICATIONS

WIPO, International Search Report and Written Opinion of the International Searching Authority for PCT Application No. PCT/US2010/024819, Mail Date Apr. 13, 2010.

* cited by examiner

*Primary Examiner* — Jessica T Stultz
(74) *Attorney, Agent, or Firm* — SoCal IP Law Group LLP; John E. Gunther; Steven C. Sereboff

(57) ABSTRACT

There is disclosed an optical element having a first surface and a second surface bounded by a circular periphery. A rim having an inner surface may extend from the second surface proximate the periphery. At least a portion of the inner surface of the rim may be convex.

3 Claims, 8 Drawing Sheets

OPTICAL ELEMENT AND STRESS ATHERMALIZED HARD CONTACT MOUNT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical systems and to stress-athermalized mounts for optical elements and optical elements suitable for mounting in stress-athermalized mounts.

2. Description of the Related Art

Optical systems are commonly constructed using transmissive elements such as lenses and filters mounted in primarily metal barrels or mounts. In this context, the term "transmissive" indicates the optical elements transmits a substantial portion, but not necessarily all, of the light within a wavelength band of interest. Transmissive materials used in optical elements include various glass, plastic, crystalline, polycrystalline, and glass-ceramic materials. Optical systems that are used outdoors or otherwise exposed to an extended range of temperatures must consider the effects of the different thermal expansion coefficients of the lens and barrel materials. A typical glass material used for optical elements has a thermal expansion coefficient of about $9 \times 10^{-6}$ per C.°, which is to say that the physical dimensions of a lens fabricated from this glass will change by 9 parts per million for each degree Celsius temperature change. Other transmissive materials used for optical elements have thermal expansion coefficients ranging from under $0.6 \times 10^{-6}$ per C.° for fused silica to more than $100 \times 10^{-6}$ per C.° for certain plastics. Lens barrels and mounts are commonly fabricated from aluminum which has a thermal expansion coefficient of $24 \times 10^{-6}$ per C.°. Lens barrels components may also be made from titanium alloys, beryllium alloys, copper alloys, magnesium alloys, various steels, or other materials, each of which has a unique thermal expansion coefficient.

For example, a glass optical element held tightly in a rigid aluminum barrel may become loose at a high temperature because of differential thermal expansion between the aluminum barrel and the glass optical element—the aluminum expands more than the glass as the system temperature increases. In contrast, a plastic optical element held in a rigid aluminum barrel may become stressed and deform or even fracture at a high system temperature, since plastic has a higher thermal expansion coefficient than aluminum. The opposite effects will occur at low system temperatures. The situation is more complex when a variety of transmissive materials are used in an optical system.

A conventional technique for alleviating the effects of differential thermal expansion is to retain optical components in a barrel or mount that incorporates a compliant member such as a spring, an elastomer O-ring or other gasket, or a flexible retainer or section of the barrel. The complaint member may than absorb the differential expansion and contraction of the various components. Compliant members may require a substantial space within the optical system. Further, the use of compliant members may still result in substantial stress in the optical components at temperature extremes and may also allow motion of the optical components under vibration and/or mechanical shock.

In this patent, an optical system in which the stress due to differential thermal expansion is alleviated or minimized for at least one optical element will be described as "stress athermalized". An optical system in which the effect of temperature on one or more optical characteristics such as focal length, centering, field of view, distortion, or other characteristics is minimized will be described as "optically athermalized".

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
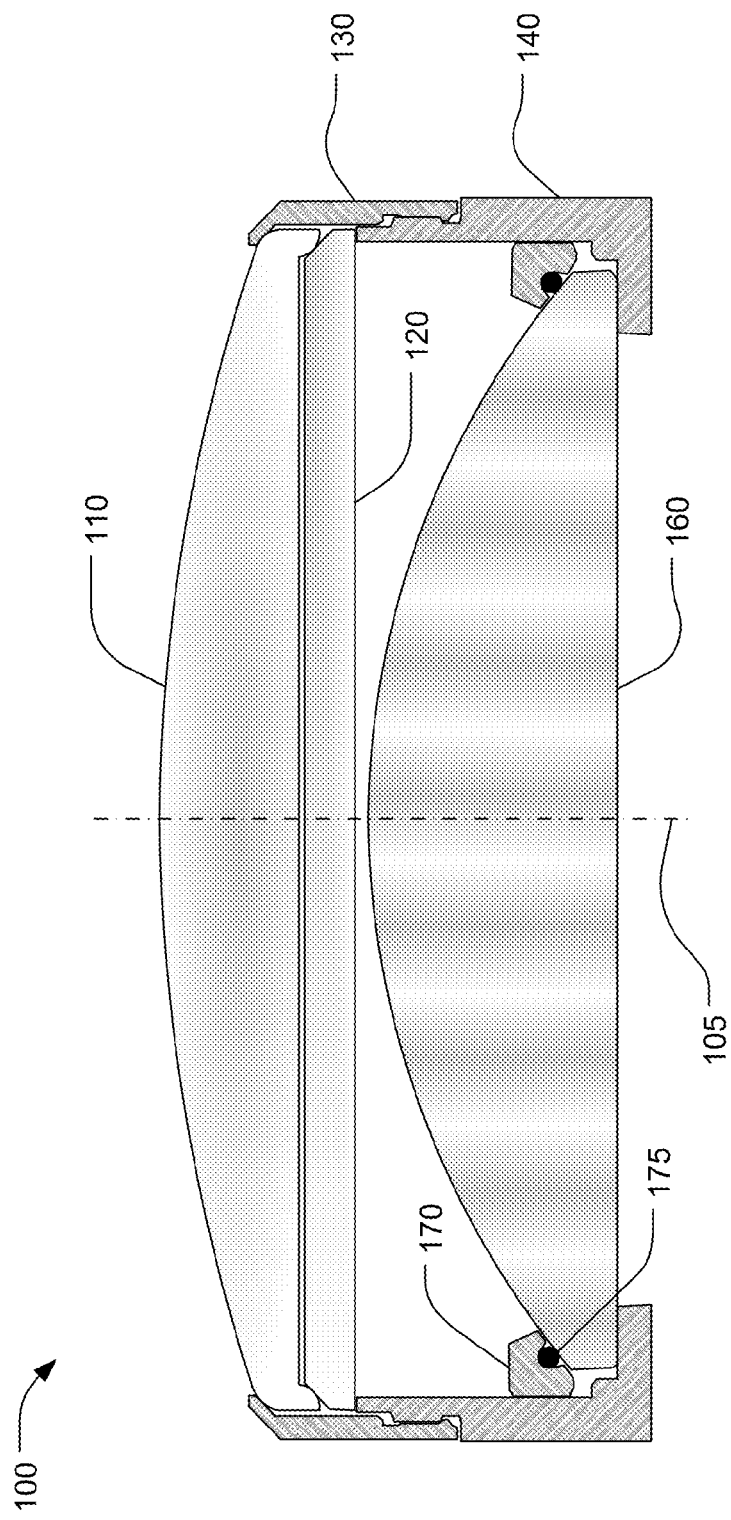
FIG. 1 is a cross-sectional view of an exemplary optical system.

Referring now to FIG. 1 an exemplary optical system 100, shown in cross section, may include a first optical element 110, a second optical element 120, and a third optical element 160. Each of the first, second, and third optical elements 110, 120, 160 may be transmissive for an operating wavelength band of the optical system 100. An optical system may include as few as one optical element and may commonly include more than three optical elements. In the example of FIG. 1, the first and third optical elements 110, 160 are shown as plano-convex lens elements, and the second optical element 120 is shown as a plano-plano element. The second optical element 120 may be, for example, a filter. Each transmissive element in an optical system may have two optical surfaces (three or more in the case of prisms), each of which may be plano, concave, or convex; spherical or aspheric; coated or uncoated. Further, one or more of the optical surfaces in an optical system may have diffractive surface features.

The first, second, and third optical elements 110, 120, 160 may be disposed within a barrel including a first barrel component 130 threaded onto a second barrel component 140. The first optical element 110 and the second optical element 120 may be retained between the first barrel component 130 and the second barrel component 140 such that there is hard mechanical contact between the first barrel component 130 and the first optical element 110, between the optical element 110 and the second optical element 120, and between the second optical element 120 and the second barrel component 140. As will be described subsequently, the first optical element 110 and the second optical element 120 may be adapted to allow stress-athermalized hard-contact mounting.

As an example of a conventional mounting technique, the third optical element 160 is shown retained in the barrel by a third barrel component 170 and an elastomer O-ring 175. The third barrel component 170 may thread into the second barrel component 140 and the compliant elastomer O-ring 175 may absorb relative motion between the third optical element 160 and the barrel due to differences in thermal expansion.

In FIG. 1 and the subsequent figures, each of the optical elements 110, 120, 160 and the barrel components 130, 140, 170 may be rotationally symmetric about an axis 105, which may be the optical axis of the optical system 100.

Figure 2:
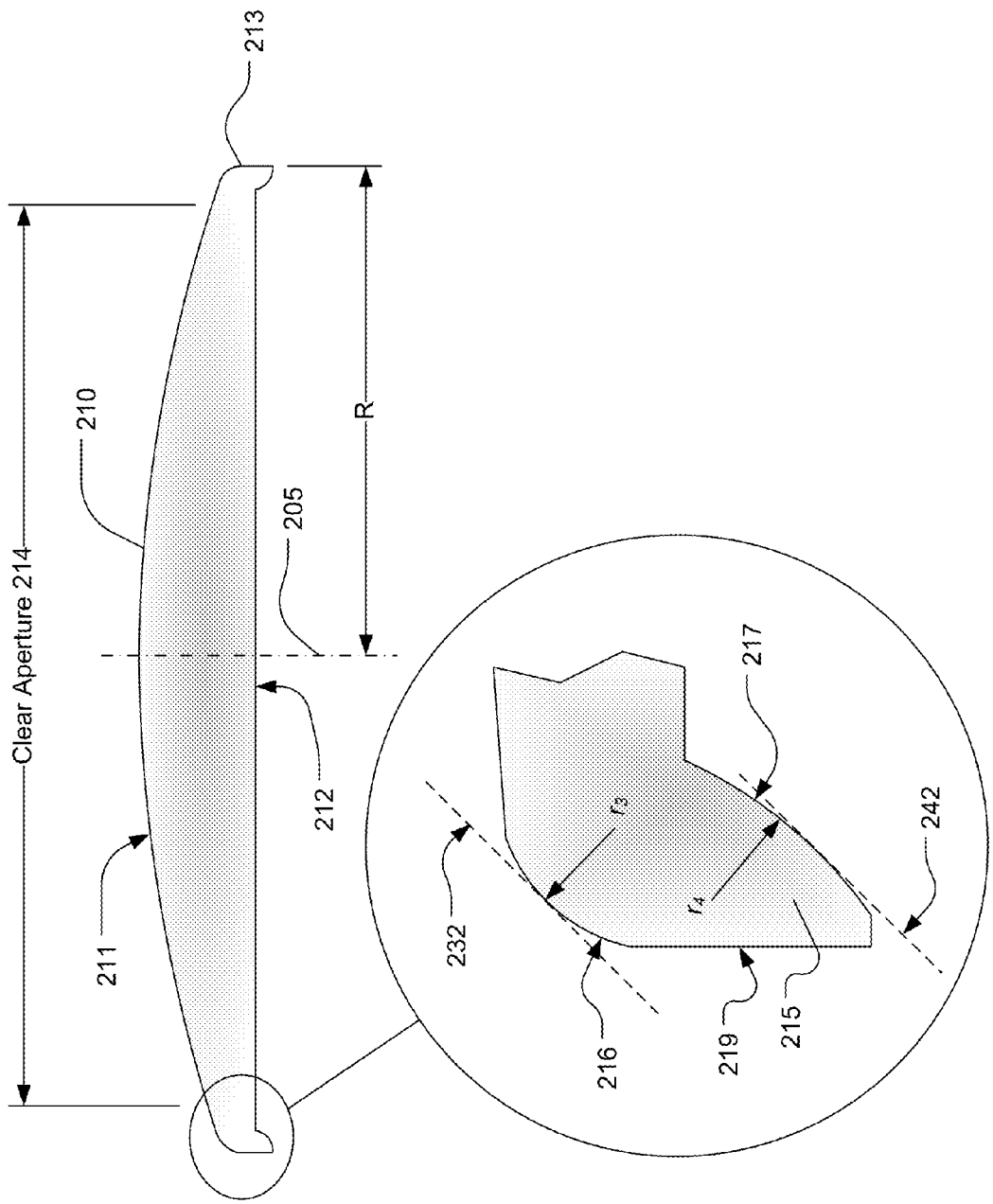
FIG. 2 is a cross-sectional view of an optical element.

Referring now to FIG. 2, an exemplary optical element 210, which may be the optical element 110, may be specifically adapted for mounting in a stress-athermalized hard-contact mount. In the example of FIG. 2, the optical element 210 is shown as a lens, but may be another optical element such as a mirror, a filter, or a diffraction optical element.

When the optical element 210 is a lens, the optical element 210 may be made of a material which is transmissive for a broad range of wavelengths, or for a specific wavelength band, or for some other portion of the electromagnetic spectrum. The optical element 210 may be made of a plastic, glass, crystalline, polycrystalline, glass-ceramic, or other transmissive material. When the optical element 210 is a mirror, the optical element 210 may be made of metal or other opaque material, or may be made of a transmissive material with a suitable reflective coating.

The optical element 210 may have a first side 211 and a generally opposing second side 212 bounded by a circular perimeter 213. The circular perimeter 213 may be centered on an optical axis 205. The optical element 210 may be rotationally symmetric about the optical axis 205. Within a central portion, commonly termed the clear aperture 214, the first side 211 may be a first optical surface. Similarly the second side 212 may be a second optical surface within a corresponding clear aperture (not shown in FIG. 2). The clear aperture 214 of the first side and the clear aperture of the second side may be the same or different. In this context, an optical surface is a surface having a controlled shape that performs a specific function by refracting, reflecting, and/or diffracting light in an optical system. When the optical element 210 is a mirror, only one of the first side and the second side may include an optical surface. In FIG. 2, the first optical surface is shown as a convex surface and the second optical surface is shown as a planar or plano surface. The first and second optical surfaces may be convex, plano, or concave; spherical or aspheric; coated or uncoated. Either or both of the first side 211 and the second side 212 may support diffractive surface features.

An annular rim 215 may extend from the second side 212. The annular rim 215 may extend from the second side 212 in a direction generally parallel to the optical axis 205. An outside surface 219 of the rim 215 may be coincident with the perimeter 213 as shown, or may be offset from the perimeter 213. The outside surface 219 and the perimeter 213 may be cylindrical or may have a slight conical taper. At least a portion of an inner surface 217 of the rim 215 may be convex, which is to say that at least a portion of the surface 217 curves or bulges outward from the rim 215 such that a line 242 tangent to the surface 217 lies outside of the rim 215. As shown in FIG. 2, a portion of the inner surface 217 of the rim 215 may be toroidal, where a toroidal surface is defined to be a portion of a torus generated by revolving a circle or a non-circular convex curve about the optical axis 205.

A peripheral portion of the first side may be a second convex surface 216. The second convex surface 216 may join the central portion of first side 211, and the outside surface 219 of the rim 215. The second convex surface 216 may curve or bulge outward such that a line 232 tangent to the surface 216 lies outside of the optical element 210. As shown in FIG. 2, the second convex surface 216 may be a second toroidal surface generated by revolving a circle or a non-circular convex curve about the optical axis 205.

When the optical element 210 is fabricated by casting or injection molding a plastic material or other moldable material, the rim 215, the convex inner surface 217, and the second convex surface 216 may be incorporated into the mold. When the optical element 210 is shaped from a material by diamond turning, the rim 215, the convex inner surface 217, and the second convex surface 216 may also be formed by diamond turning or by conventional grinding and polishing.

Figure 3B:
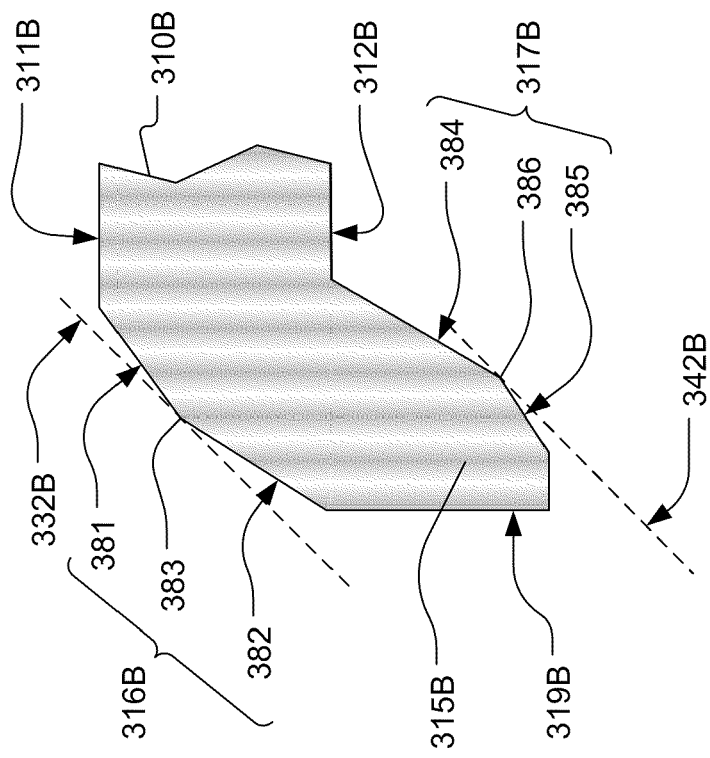
FIG. 3B is a partial cross-sectional view of an optical element.
Figure 3A:
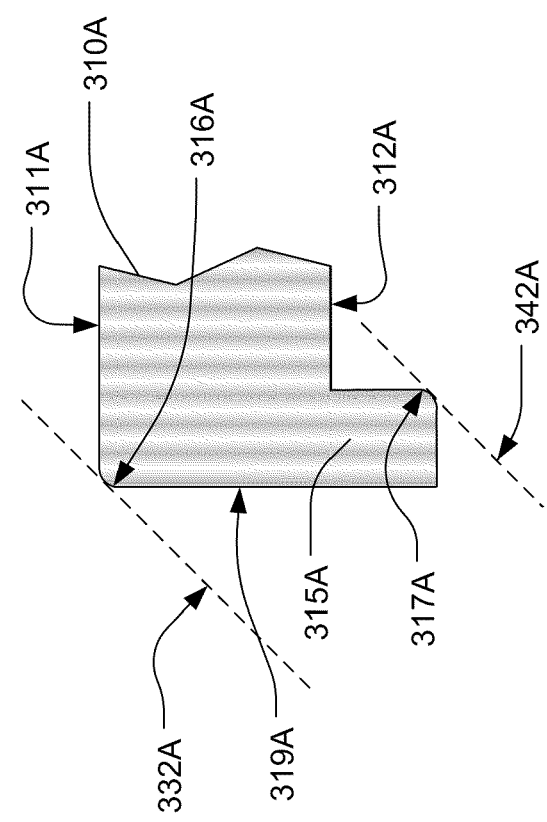
FIG. 3A is a partial cross-sectional view of an optical element.

Referring now to FIG. 3A, another exemplary optical element 310A may include a first side 311A and a second side 312A. An annular rim 315A may extend from the second side 312A. The annular rim 315A may extend from the second side 312A in a direction generally parallel to an optical axis (not shown). An outside surface 319A of the rim 315A may be cylindrical or may have a slight conical taper.

At least a portion of an inner surface of the rim 315A may be a convex surface 317A. The inner convex surface 317A may be configured such that a tangent 342A to the inner convex surface 317A lies outside of the rim 315A. As shown in the example of FIG. 3A, the inner convex surface 317A may be a toroidal surface.

A peripheral portion of the first side 311 may be a second convex surface 316A. The second convex surface 316A may form a portion of a transition between the outside surface 319A of the rim 315A and a central portion of the first side 311A. As shown in the example of FIG. 3A, the second convex surface 316A may also be a toroidal surface.

Referring now to FIG. 3B, another exemplary optical element 310B may include a first side 311B and a second side 312B. An annular rim 315B may extend from the second side 312B. The annular rim 315B may extend from the second side 312B in a direction generally parallel to an optical axis (not shown). An outside surface 319B of the rim 315B may be cylindrical or may have a slight conical taper.

An inner side 317B of the rim 315B may be comprised of two or more conical sections 384, 385. The conical sections 384, 385 may meet at an intersection 386. The intersection 386 may be abrupt or may have a finite radius. In the case where the intersection 386 has a finite radius, the intersection 386 may be a toroidal surface joining the conical sections 384, 385. The inner surface 317B of the rim 315B may be configured such that a tangent 342B to the intersection 386 lies outside of the rim 315B. In the case where the conical sections 384, 385 meet at a sharp intersection 386, the inner surface 317B of the rim 315B may be configured such that a line 342B intersects the intersection 386 and lies outside of the rim 315B. Thus the inner surface 317B of the rim 315B is considered to be a convex surface as previously defined.

A peripheral portion of the first side 311B may be a second convex surface 316B comprised of two or more conical sections 381, 382. The conical sections 381, 382 may meet at an intersection 383. The intersection 383 may be abrupt or may be a toroidal surface having a finite radius. The conical sections 381, 382 may be configured such that a tangent 332B to the intersection 383 lies outside of the optical element 310B. In the case where the conical sections 384, 385 meet at a sharp intersection 386, the inner surface 317B of the rim 315B may be configured such that a line 342B intersects the intersection 386 and lies outside of the rim 315B. Thus the surface 316B is correctly considered to be a convex surface as previously defined.

Figure 4:
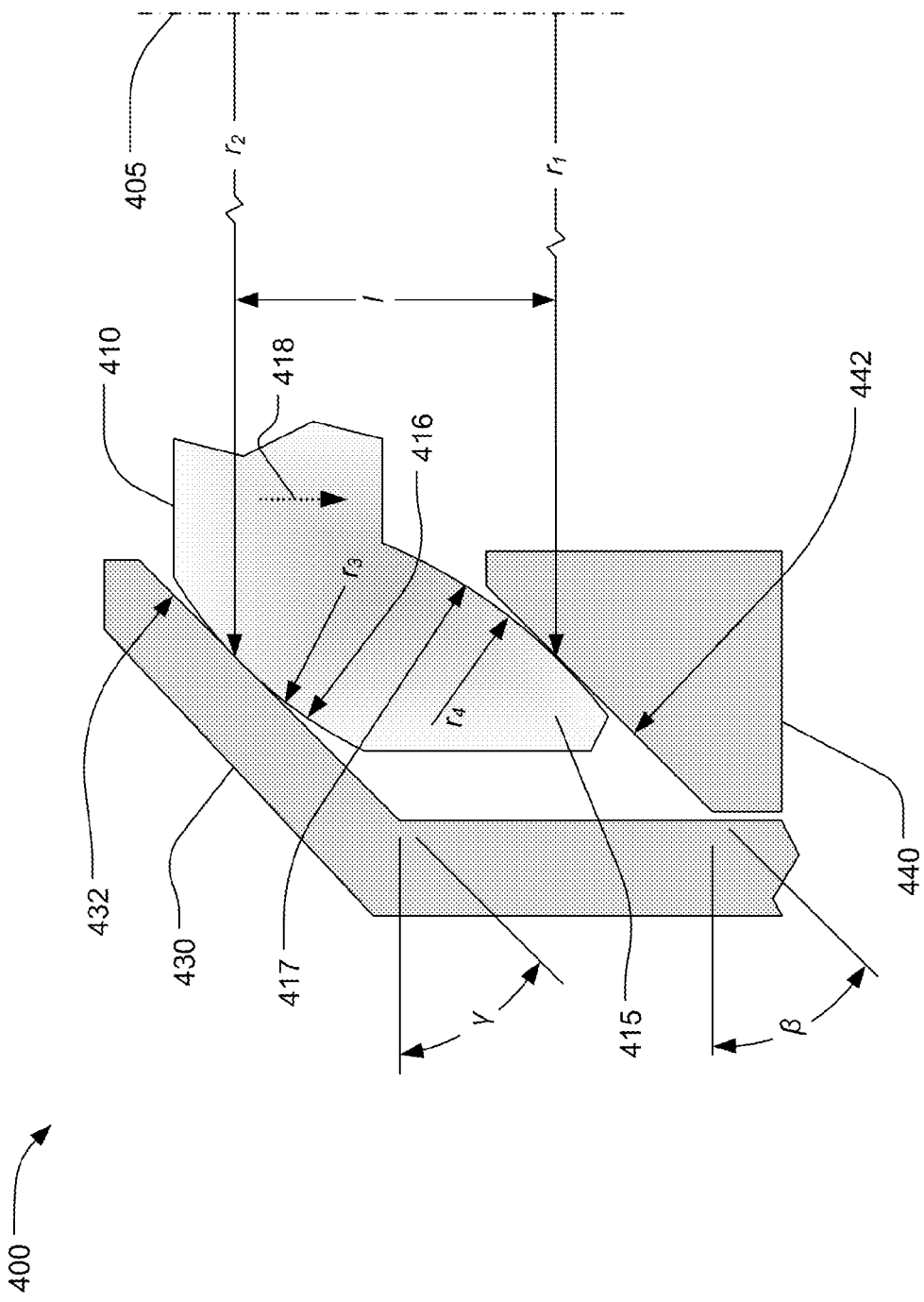
FIG. 4 is a partial cross-sectional view of another exemplary optical system.

Referring now to FIG. 4, an optical element 410 may have a rim 415 including a convex inner surface 417 and a second convex surface 416. As shown in FIG. 4, the optical element 410 may be similar to the optical element 210, but could also be the optical element 310A, the optical element 310B, or another optical element having a rim including a convex inner surface. The optical element 410 may be mounted in a barrel between a first barrel component 430 and a second barrel component 440. The first barrel component 430 and the second barrel component 440 may be joined, for example by a threaded coupling not shown in FIG. 4, such that both the first barrel component 430 and the second barrel component 440 are in hard contact with the optical element 410. In this context, a "hard contact" is a contact without an intervening resilient or compliant member. Specifically, the convex inner surface 417 may be tangential to a conical surface 442 of the second barrel component 440, and the second convex surface 416 may be tangential to a conical surface 432 of the first barrel component 430.

In the cross-section view of FIG. 4, the convex inner surface 417 and the first conical surface 442 are seen as a convex curve and a line, respectively, which may intersect at a single point, commonly called the "point of tangency". However, the optical element 410, and the barrel components 430, 440 are rotationally symmetrical about an optical axis 405. Thus the intersection between the convex inner surface 417 and the first conical surface 442 may be a circle, herein termed the "circle of tangency", generated by rotating the point of tangency about the optical axis 405.

A tangential contact between an ideal convex surface and an ideal conical surface will be a planar circle having a "line width" of zero. In practice, a compressive preload may be applied such that at least some deformation occurs at the contacts between the optical elements and barrel components. In this case, the circle of tangency between a convex surface and a conical surface, such as the contact between the convex inner surface 417 and the first conical surface 442, may be a narrow annular contact ring having a finite contact area.

In the case, not shown in FIG. 4, where the convex inner surface 417 is comprised of two or more conical sections (as shown in FIG. 3B), a sharp intersection between two of the conical surfaces may be in contact with, and thus considered tangential to, the conical surface 442 of the second barrel component 440. Similarly, in the case, not shown in FIG. 4, where the second convex surface 416 is comprised of two or more conical sections (as shown in FIG. 3B), a sharp intersection between two of the conical surfaces may be in contact with, and thus considered tangential to, the conical surface 432 of the first barrel component 430.

The circle of tangency between the convex inner surface 417 and the conical surface 442 of the second barrel component 440 may have a radius $r_1$. Similarly, the intersection between the second convex surface 416 and the conical surface 432 of the first barrel component 430 may be a circle of tangency having a radius $r_2$. The radius $r_1$ and the radius $r_2$ may be the same or different.

A radius of curvature $r_4$ of the inner surface 417 at the point of contact with the conical surface 442 may be small enough to ensure a singular contact circle between the convex inner surface 417 and the conical surface 442. Further, radius of curvature $r_4$ may be large enough to facilitate the convex inner surface sliding along the conical surface 442 in response to changes in system temperature. Within these limits, the radius of curvature $r_4$ is not critical. The allowable range for the radius of curvature $r_4$ may depend on the materials and surface treatments of the optical element 410 and the barrel component 440, and may be determined, for example, by finite element analysis or experimentation. The cross-sectional shape of the convex inner surface 417 may be circular, or may be any convex shape that contacts the first conical surface 442 along a first circle of tangency.

Similarly, a radius of curvature $r_3$ of the second convex surface 416 at the point of contact with the conical surface 432 may be small enough to ensure a singular contact circle between the second convex surface 416 and the conical surface 432. Further, the radius of curvature $r_3$ may be large enough to allow sliding motion of the second convex surface 416 along the conical surface 432, but is otherwise not critical. The cross-sectional shape of the second convex surface 416 may be circular, or may be any convex shape that contacts the second conical surface 432 along a second circle of tangency.

The first circle of tangency may lie in a first plane and the second circle of tangency may line in a second plane. Both the first plane and the second plane may be orthogonal to the optical axis 405. The distance between the first plane and the second plane, measured parallel to the optical axis 405 may be a distance 1. The conical surface 442 of the second barrel component 440 may form an angle $\beta$ with a normal to the optical axis 205. The conical surface 432 of the first barrel component 430 may form an angle $\gamma$ with a normal to the optical axis 405.

The optical element 410 may be mounted by, for example, placing the optical element 410 into the first barrel component 430 and then threading the first barrel component 430 and the second barrel component 440 together until both barrel components firmly contact the optical element 410. The optical element 410 may then be firmly held by the barrel components 430, 440, at least for the single temperature at which the assembly was done. However, at temperatures other than the assembly temperature, there may be interference between the optical element 410 and the barrel components 430, 440 due to different thermal expansion coefficients. Assuming the optical element 410 is free to slide against the conical surfaces 432, 442, the interference may be quantified by a linear difference, parallel to the optical axis, between the thermal expansion/contraction of the optical element 410 and the thermal expansion/contraction of the barrel components 430, 440, as follows:

Interference=(axial optical element growth)−(axial barrel growth)−(axial motion along the first conical surface 442 due to radial optical element growth relative to radial growth of the barrel components)+(axial motion along the second conical surface 432 due to radial optical element growth relative to radial growth of the barrel components) (1)

Specifically, interference is approximated by:

Interference≈$\Delta T[\alpha_o l - \alpha_b l - (\alpha_o - \alpha_b) r_1 \tan \beta + (\alpha_o - \alpha_b) r_2 \tan \gamma]$, (2)

where $r_1$, $r_2$, l, $\beta$, and $\gamma$ were previously defined, $\Delta T$ is the temperature change, and $\alpha_o$ and $\alpha_b$ are the thermal expansion coefficients of the optical element 410 and the barrel components 430, 440, respectively. It is assumed that the barrel components 430, 440 have the same thermal expansion coefficient. Equation (2) and the subsequent equations also assume an isothermal situation where all of the optical elements and barrel components are at the same temperature. A positive value for interference indicates that the barrel components 430, 440 are exerting an increased compressive force on the optical element 410, and a negative value for interference may indicate that the barrel components 430, 440 are exerting a decreased compressive force on the optical element 410 or that the optical element 410 is no longer in hard contact with the barrel components 430, 440.

If $\alpha_o$ and $\alpha_b$ are equal, there is no temperature-dependent interference. Equation (2) may be simplified to:

$$\text{Interference} \approx \Delta T(\alpha_o - \alpha_b)[1 - r_1 \tan\beta + r_2 \tan\gamma], \quad (3)$$

To ensure that the optical element 410 is held by the barrel components consistently over the temperature range, the temperature-dependent interference may be set to zero. In this case, $\beta$ and $\gamma$ are related by the equation:

$$\beta = \arctan\left[\frac{l + r_2 \tan\gamma}{r_1}\right]. \quad (4)$$

Thus the angle $\beta$ and $\gamma$ may be selected such that the optical element 410 is held in hard contact over a range of temperatures without the use of a compliant member.

An assembly, such at that shown in FIG. 4, in which an optical element is mounted with a convex inner surface tangent to a first conical surface and a second convex surface tangent to a second conical surface, will be referred to as a "double tangent mount". A double tangent mount in accordance with equation (4) will be referred to as a "stress athermalized" double tangent mount.

The optical element 410 may move axially, or in a direction parallel to the optical axis 405, with temperature since the convex surfaces 416, 417 may slide along the conical surfaces 432, 442 as the temperature changes. When the optical element 410 has a higher thermal expansion coefficient that that of the barrel components 430, 440, the optical element 410 will move in the direction shown by the arrow 418 as the temperature of the system 400 increases. When the optical element 410 has a lower thermal expansion coefficient that that of the barrel components 430, 440, the optical element 410 will move in the direction shown by the arrow 418 as the temperature decreases. The axial motion with temperature of an optical element held in a double-tangent mount may be useful to optically athermalize, at least in part, an optical system such as the optical system 100.

Figure 5:
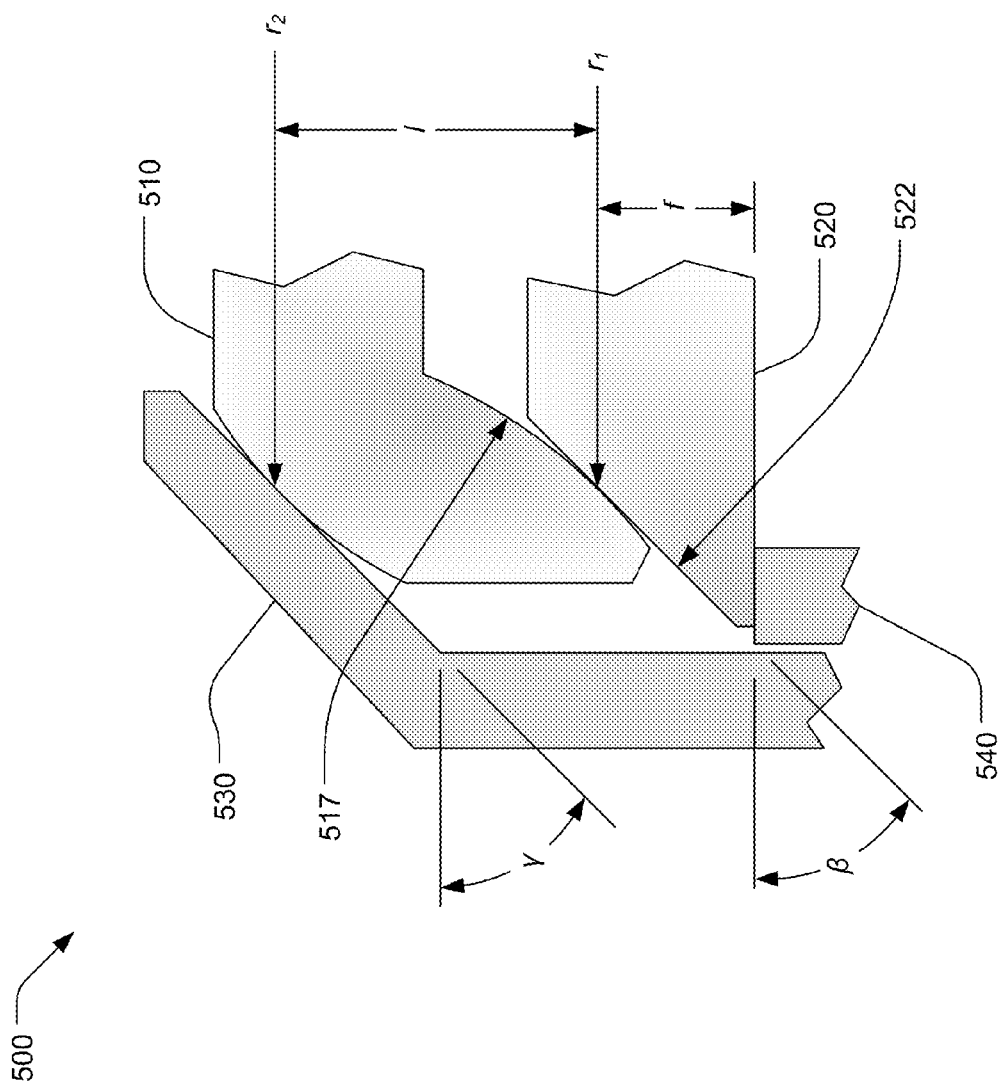
FIG. 5 is a partial cross-sectional view of another exemplary optical system.

Referring now to FIG. 5, an optical system 500 may include a first optical element 510, which may be the optical element 210, and a second optical element 520. The first optical element 510 and the second optical element 520 may be held in a barrel including a first barrel component 530 and a second barrel component 540. The features of the first optical element 510 and the first barrel component 530 may be similar to the features of the counterpart components in FIG. 3, and will not be described again. The first optical element 510 may be held in a double-tangent mount as previously described. However, in FIG. 5, a convex inner surface 517 of the first optical element may be held against a conical surface 522 of the second optical element 520. The mounting of the first optical element 510 and the second optical element 520 may be approximately stress-athermalized if the following relationship is satisfied:

$$\beta = \arctan\left[\frac{(\alpha_2 - \alpha_b)f + (\alpha_1 - \alpha_b)(l + r_2 \tan\gamma)}{(\alpha_1 - \alpha_2)r_1}\right], \quad (5)$$

where $r_1$, $r_2$, and $l$ are as previously defined; f is a distance, parallel to the optical axis, between a first plane containing the first circle of tangency and a second plane containing the interface between the second optical element 520 and the first barrel component 540; and $\alpha_1$, $\alpha_2$, $\alpha_b$ are the coefficients of thermal expansion of the first optical element, the second optical element, and the barrel, respectively.

Figure 6:
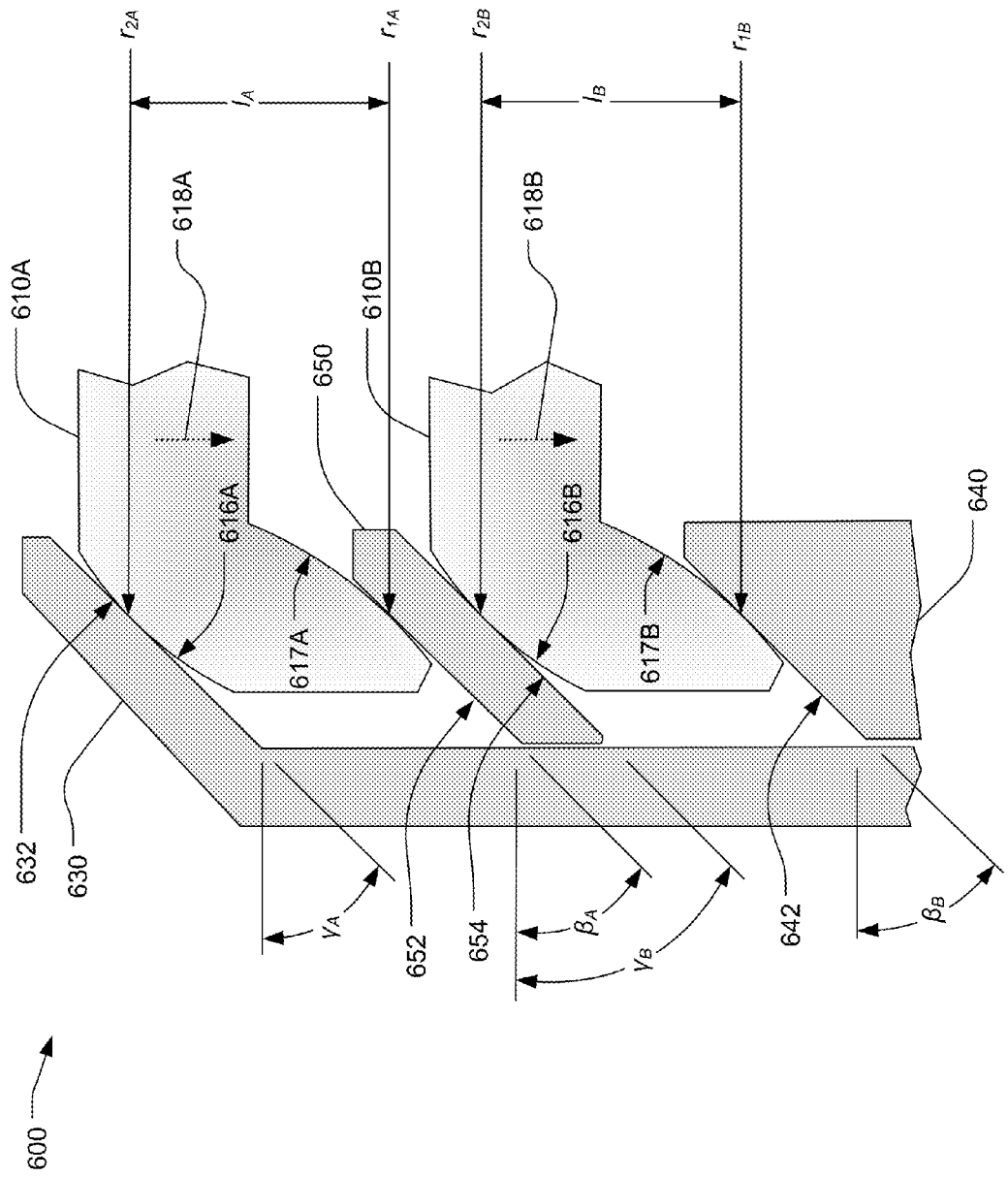
FIG. 6 is a partial cross-sectional view of another exemplary optical system.

Referring now to FIG. 6, an optical system 600 may include a first optical element 610A and a second optical element 610B, both of which may be similar to the optical element 200. The first optical element 610A and the second optical element 610B may be mounted in a barrel including a first barrel component 630, a second barrel component 640, and a spacer component 650.

Both the first optical element 610A and the second optical element 610B may be held in a double-tangent mount as previously described. A convex inner surface 617A of the first optical element 610A may be tangential to a first conical surface 652. A second convex surface 616A of the first optical element 610A may be tangential to a second conical surface 632. A convex inner surface 617B of the second optical element 610B may be tangential to a third conical surface 642. A second convex surface 616B of the second optical element 610B may be tangential to a fourth conical surface 654. The first and fourth conical surfaces 652, 654 may be surfaces of the spacer component 650. The second conical surface 632 may be a surface of the first barrel component 630. The third conical surface 642 may be a surface of the second barrel component 640.

The mounting of the first optical element 610A and the second optical element 610B may be approximately stress-athermalized if the following relationships are satisfied:

$$\beta_A = \arctan\left[\frac{l_A + r_{2A}\tan\gamma_A}{r_{1A}}\right], \text{ and} \quad (5)$$

$$\beta_B = \arctan\left[\frac{l_B + r_{2B}\tan\gamma_B}{r_{1B}}\right], \quad (6)$$

where all of the parameters were previously defined in conjunction with equations (2) and (3). Equations (5) and (6) assume that the coefficients of thermal expansion of the barrel components 630, 640, 650 are the same. When both equations (5) and (6) are satisfied, the spacer component 650 may not move substantially in the barrel as a function of temperature.

Both the optical element 610A, 610B may move axially with temperature since their respective convex surfaces 616A/B, 617A/B may slide along the conical surfaces 632, 642, 652, 654 as the temperature changes. When the optical element 610A has a higher thermal expansion coefficient that that of the barrel components 630, 640, 650, the optical element 610A will move in the direction shown by the arrow 618A as the temperature increases. When optical element 610A has a lower thermal expansion coefficient that that of the barrel components 630, 640, 650, the optical element 610A will move in the direction shown by the arrow 618A as the temperature decreases. The optical element 610B will move similarly as indicated by the arrow 618B.

The axial motion of the optical elements 610A and 610B may be the same or different. The relative axial motion of the optical elements 610A and 610B to the barrel components 630 and 640 may be determined, in part, by selection of the angles $\gamma_A$ and $\gamma_B$. The relative axial motion of the first and second optical elements 610A, 610B to the barrel components 630 and 640 with temperature may be useful to optically athermalize, at least in part, an optical system such as the optical system 600.

Figure 7:
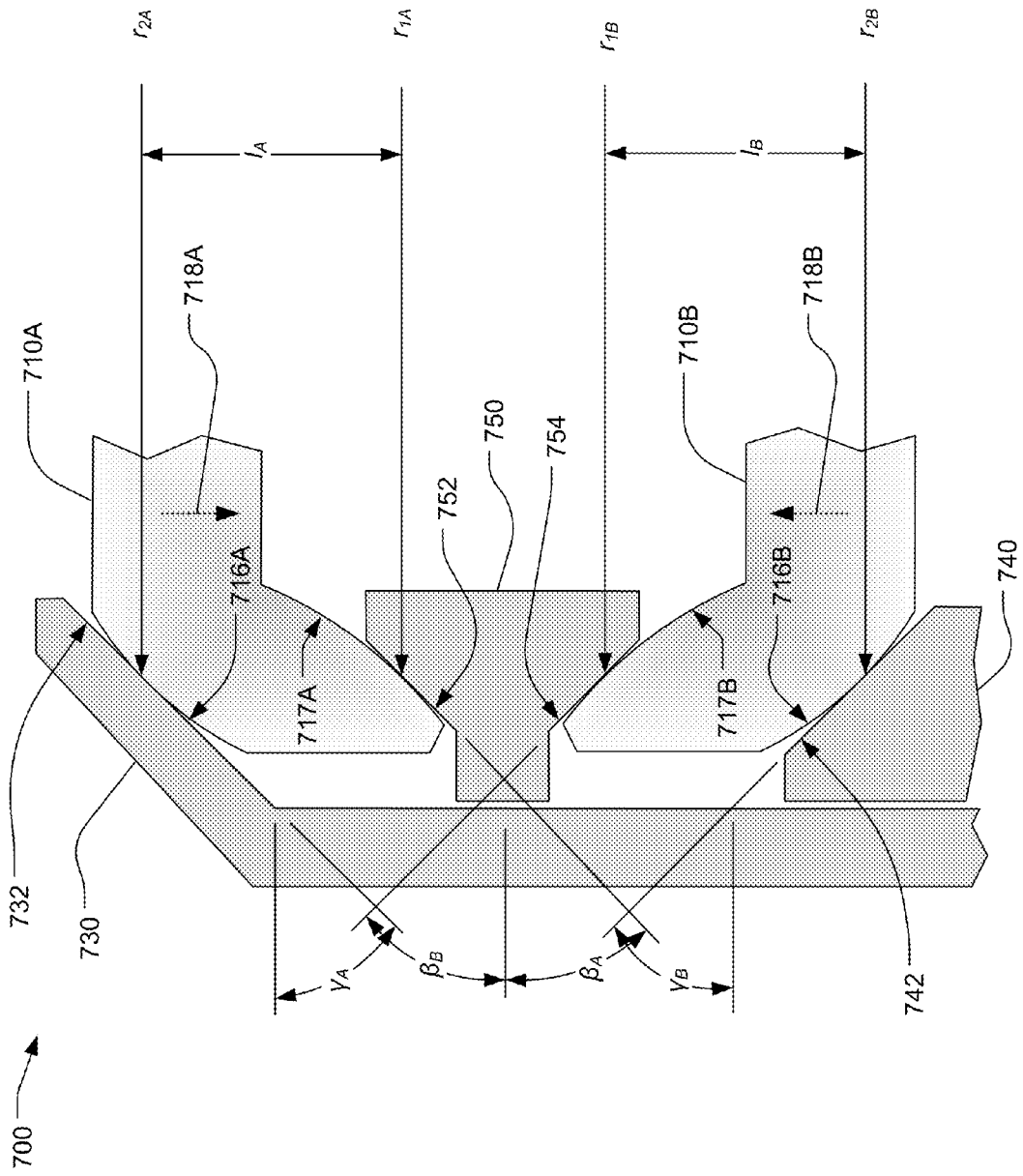
FIG. 7 is a partial cross-sectional view of another exemplary optical system.

Referring now to FIG. 7, an optical system 700 may include a first optical element 710A and a second optical element 710B, both of which may be similar to the optical element 200. The first optical element 710A and the second optical element 710B may be mounted in a barrel including a first barrel component 730, a second barrel component 740, and a spacer component 750.

Both the first optical element 710A and the second optical element 710B may be held in a double-tangent mount as previously described. A convex inner surface 717A of the first optical element 710A may be tangential to a first conical surface 752. A second convex surface 716A of the first optical element 710A may be tangential to a second conical surface 732. A convex inner surface 717B of the second optical element 710B may be tangential to a third conical surface 754. A second convex surface 716B of the second optical element 710B may be tangential to a fourth conical surface 742. The first and third conical surfaces 752, 754 may be surfaces of the spacer component 750. The second conical surface 732 may be a surface of the first barrel component 730. The fourth conical surface 742 may be a surface of the second barrel component 740. The mounting of the first optical element 710A and the second optical element 710B may be approximately stress-athermalized if equations (5) and (6) are satisfied. Equations (5) and (6) assume that the coefficients of thermal expansion of the barrel components 730, 740, 750 are the same. When both equations (5) and (6) are satisfied, the spacer component 750 may not move substantially in the barrel as a function of temperature.

As previously discussed in conjunction with FIG. 6, both optical elements 710A, 710B may move axially with temperature since their respective convex surfaces 716A/B, 717A/B may slide along the conical surfaces 732, 742, 752, 754 as the temperature changes. The arrows 718A and 718B indicate the directions that first and second optical elements 710A, 710B may move as the temperature increases when the thermal expansion coefficient of the optical elements 710A, 710B is higher than the thermal expansion coefficient of the barrel components 730, 740, 750. In contrast to the optical system 600, the first and second optical elements 710A, 710B may move in opposing directions if both optical elements are made of a high thermal expansion material.

The relative magnitude of the axial motion of the optical elements 710A and 710B may be determined, in part, by selection of the angles $\gamma_A$ and $\gamma_B$. The relative axial motion of the first and second optical elements 710A, 710B with temperature may be useful to optically athermalize, at least in part, an optical system such as the optical system 700.

Figure 8:
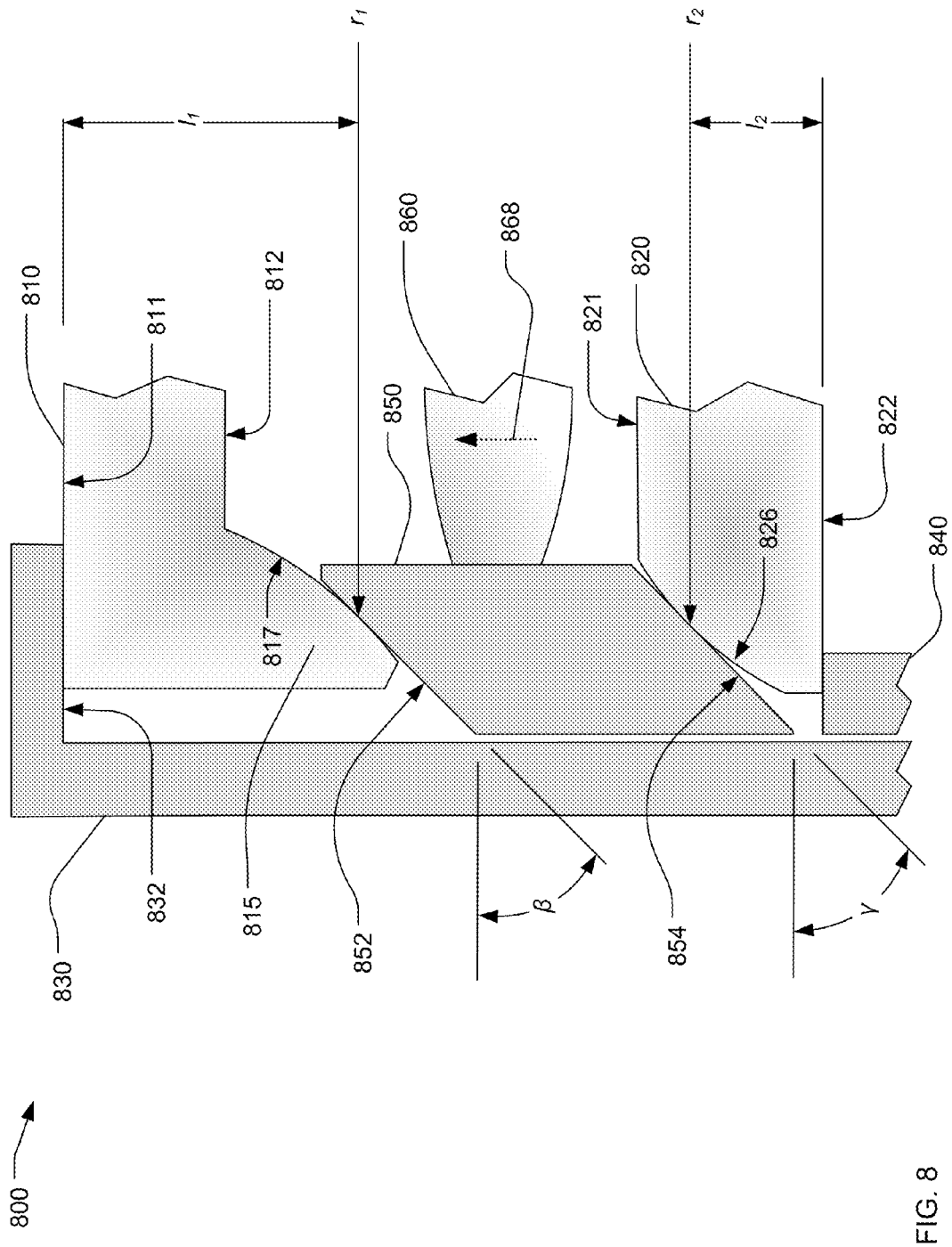
FIG. 8 is a partial cross-sectional view of another exemplary optical system.

Referring now to FIG. 8, an optical system 800 may include a first optical element 810 and a second optical element 820. The first optical element 810 and the second optical element 820 may be held in a barrel including a first barrel component 830, a second barrel component 840, and a spacer component 850. The spacer component 850 may have a first conical surface 852 and a second conical surface 854.

The first optical element 810 may have a first side 811 and a second side 812. The first side 811 may be disposed against a surface 832 of the first barrel component 830. An annular rim 815 may extend from the second side 812. An inner surface 817 of the rim 815 may be convex. The inner surface 817 may be tangent to the first conical surface 852.

The second optical element 820 may have a first side 821 and a second side 822. The second side 822 may be disposed against the second barrel component 840. A peripheral portion of the first side 821 may be a second convex surface 826. The second convex surface 826 may be tangential to the second conical surface 854.

Assuming that the first optical element 810 and the second optical element 820 have the same thermal expansion coefficient, and assuming that the barrel components 830, 840, 850 have the same thermal expansion coefficient, the mounting of the first optical element 810 and the second optical element 820 may be approximately stress-athermalized if the following relationship is satisfied:

$$\beta = \arctan\left[\frac{l_1 + l_2 + r_2 \tan\gamma}{r_1}\right], \quad (7)$$

where $r_1$, $r_2$, $\beta$, and $\gamma$ were previously defined; $l_1$ is the distance, parallel to the optical axis, from a plane containing the contact between the first side 811 of the first optical element 810 and the first barrel component 830 to a plane containing the circle of tangency of the convex inner surface 817 and the first conical surface 852; and $l_2$ is the distance, parallel to the optical axis, from a plane containing the contact between the second side 822 of the second optical element 820 and the second barrel component 840 to a plane containing the circle of tangency of the second convex surface 826 and the second conical surface 854.

In the optical system 800, the first optical element 810 and the second optical element 820 remain in contact with the respective first and second barrel components independent of temperature changes. Thus the relative positions of the first optical element 810 and the second optical element 820 may be determined by the thermal expansion of the barrel components only. The spacer component 850 may move axially as the temperature changes. Assuming the first optical component and the second optical component are made of a material having a higher thermal expansion coefficient than that of the barrel components 830, 84, 850, the arrow 868 indicates the direction of motion of the spacer component 850 as the temperature increases.

The motion of the spacer component 850 with temperature may be a useful tool to optically athermalize an optical system. For example, a third optical element 860 may be coupled to move with the spacer component 850. The motion of the third optical element 860 with respect to the first and second optical elements 810, 820 may be useful to optically athermalize, at least in part, the optical system 800.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An optical system, comprising:
   a barrel comprising a first conical surface and a second conical surface; and
   an optical element having
      a first side and a second side bounded by a circular perimeter centered on an optical axis, and
      an annular rim extending from a peripheral portion of the second side in a direction principally parallel to the optical axis, the rim having an inner surface,
      wherein at least a portion of the inner surface is a first convex surface and a peripheral portion of the first side of the optical element is a second convex surface,
   wherein:
   the optical element is disposed within the barrel with the first convex surface tangent to the first conical surface and the second convex surface tangent to the second conical surface,
   the first conical surface forms an angle β with a normal to the optical axis,
   the second conical surface forms an angle γ with the normal to the optical axis, and
   β and γ are related by the equation:

$$\beta = \arctan\left[\frac{l + r_2 \tan\gamma}{r_1}\right]$$

wherein:
   $r_1$ is a radius from the optical axis to a first circle of tangency between the first convex surface and the first conical surface,
   $r_2$ is a radius from the optical axis to a second circle of tangency between the second convex surface and the second conical surface, and
   l is a distance, parallel to the optical axis between a first plane containing the first circle of tangency and a second plane containing the second circle of tangency.

2. An optical system, comprising:
   a first optical element comprising:
      a first side and a second side bounded by a circular perimeter centered on an optical axis, and
      an annular rim extending from a peripheral portion of the second side in a direction principally parallel to the optical axis, the rim having an inner surface,
      wherein at least a portion of the inner surface is a first convex surface and a peripheral portion of the first side of the first optical element is a second convex surface;
   a second optical element having a third side and a fourth side, a portion of the third side of the second optical element forming a first conical surface; and
   a barrel comprising a second conical surface,
   wherein:
   the first optical element and the second optical element are disposed within the barrel with the first convex surface tangent to the first conical surface and the second convex surface tangent to the second conical surface,
   the first conical surface forms an angle β with a normal to the optical axis,
   the second conical surface forms an angle γ with the normal to the optical axis, and
   β and γ are related by the equation:

$$\beta = \arctan\left[\frac{(\alpha_2 - \alpha_b)f + (\alpha_1 - \alpha_b)(l + r_2\tan\gamma)}{(\alpha_1 - \alpha_2)r_1}\right]$$

wherein:
   $r_1$ is a radius from the optical axis to a first circle of tangency between the first convex surface and the first conical surface,
   $r_2$ is a radius from the optical axis to a second circle of tangency between the second convex surface and the second conical surface,
   l is the distance, parallel to the optical axis between a first plane containing the first circle of tangency and a second plane containing the second circle of tangency,
   f is a distance, parallel to the optical axis, between the first plane and a third plane containing the interface between the second side of the second optical element and the barrel
   $\alpha_1$, $\alpha_2$, $\alpha_b$ are the coefficients of thermal expansion of the first optical element, the second optical element, and the barrel, respectively.

3. An optical system, comprising:
   a barrel;
   a first optical element having
      a first side and a second side bounded by a circular perimeter centered on an optical axis, and
      an annular rim extending from a peripheral portion of the second side in a direction principally parallel to the optical axis, the rim having an inner surface, wherein at least a portion of the inner surface is a first convex surface;
   a second optical element comprising a third side and a fourth side bounded by a circular periphery centered on the optical axis, wherein a peripheral portion of the third side is a second convex surface; and
   a spacer ring, a first end of the spacer ring forming a first conical surface and a second end of the spacer ring forming a second conical surface,
   wherein:
   the first lens, the spacer ring, and the second lens are disposed with the barrel with the first convex surface tangent to the first conical surface and the second convex surface tangent to the second convex surface the first conical surface forms an angle $\beta$ with a normal to the optical axis, the second conical surface forms an angle $\gamma$ with the normal to the optical axis, and $\beta$ and $\gamma$ are related by the equation:

$$\beta = \arctan\left[\frac{l_1 + l_2 + r_2\tan\gamma}{r_1}\right]$$

wherein:

$r_1$ is a radius from the optical axis to a first circle of tangency between the convex inner surface and the first conical surface, $r_2$ is a radius from the optical axis to a second circle of tangency between the second convex surface and the second conical surface, and $l_1$ and $l_2$ are thicknesses, parallel to the optical axis, of the first optical element at the first circle of tangency and the second optical element at the second circle of tangency, respectively.

* * * * *